United States Patent
Henry

(10) Patent No.: US 11,985,246 B2
(45) Date of Patent: May 14, 2024

(54) SYSTEMS AND METHODS FOR PROTECTING IDENTITY METRICS

(71) Applicant: Meta Platforms, Inc., Menlo Park, CA (US)

(72) Inventor: Colleen Kelly Henry, Oakland, CA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

(21) Appl. No.: 17/349,480

(22) Filed: Jun. 16, 2021

(65) Prior Publication Data

US 2022/0407710 A1    Dec. 22, 2022

(51) Int. Cl.
*H04L 9/32* (2006.01)
*G10L 17/22* (2013.01)
*G10L 25/51* (2013.01)

(52) U.S. Cl.
CPC .......... *H04L 9/3234* (2013.01); *G10L 17/22* (2013.01); *G10L 25/51* (2013.01); *H04L 9/3231* (2013.01)

(58) Field of Classification Search
CPC ..... H04L 9/3234; H04L 9/3231; G10L 17/22; G10L 25/51
See application file for complete search history.

(56) References Cited

U.S. PATENT DOCUMENTS

| | | | |
|---|---|---|---|
| 6,476,815 B1 * | 11/2002 | Ando | G06T 13/205 345/473 |
| 9,600,676 B1 * | 3/2017 | Farmer | H04L 9/3271 |
| 2010/0217837 A1 * | 8/2010 | Ansari | G06F 16/64 709/224 |

(Continued)

FOREIGN PATENT DOCUMENTS

| | | |
|---|---|---|
| EP | 2767907 A1 | 8/2014 |
| WO | 2018045553 A1 | 3/2018 |

OTHER PUBLICATIONS

EPO: "Machine Translation of WO2018045553A1," Jan. 1, 2019, 16 pages.

(Continued)

*Primary Examiner* — Jason K Gee
*Assistant Examiner* — Brian William Avery
(74) *Attorney, Agent, or Firm* — Greenberg Traurig, LLP

(57) ABSTRACT

A computer-implemented method for protecting identity metrics may include (i) receiving, by a computing device and from an originating device, an identity metric encrypted by an identity metric protection module on the originating device, where the identity metric includes biometric data about an operator of the originating device, (ii) requesting, by an identity metric protection module on the computing device, a decryption key from an identity metric protection server, (iii) receiving, by the identity metric protection module, the decryption key from the identity metric protection server, (iv) decrypting, by the identity metric protection module, the identity metric with the decryption key received from the identity metric protection server, and (v) providing the decrypted identity metric to an application on the computing device that uses the identity metric to convey a communication from the operator of the originating device. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2011/0115798 | A1* | 5/2011 | Nayar | G06T 13/40 |
| | | | | 345/473 |
| 2012/0028605 | A1* | 2/2012 | Ishihara | H04M 1/72412 |
| | | | | 455/410 |
| 2013/0080772 | A1* | 3/2013 | McGowan | G06F 21/606 |
| | | | | 713/165 |
| 2013/0124863 | A1* | 5/2013 | Drucker | H04L 9/3226 |
| | | | | 713/168 |
| 2018/0287792 | A1* | 10/2018 | Fu | H04L 9/0822 |
| 2020/0213680 | A1 | 7/2020 | Ingel et al. | |
| 2021/0224319 | A1* | 7/2021 | Ingel | G10L 17/26 |

OTHER PUBLICATIONS

International Search Report and Written Opinion for International Application No. PCT/US2022/032003 dated Aug. 17, 2022, 10 pages.
International Preliminary Report on Patentability for International Application No. PCT/US2022/032003, mailed Dec. 28, 2023, 8 pages.

\* cited by examiner

SYSTEMS AND METHODS FOR PROTECTING IDENTITY METRICS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
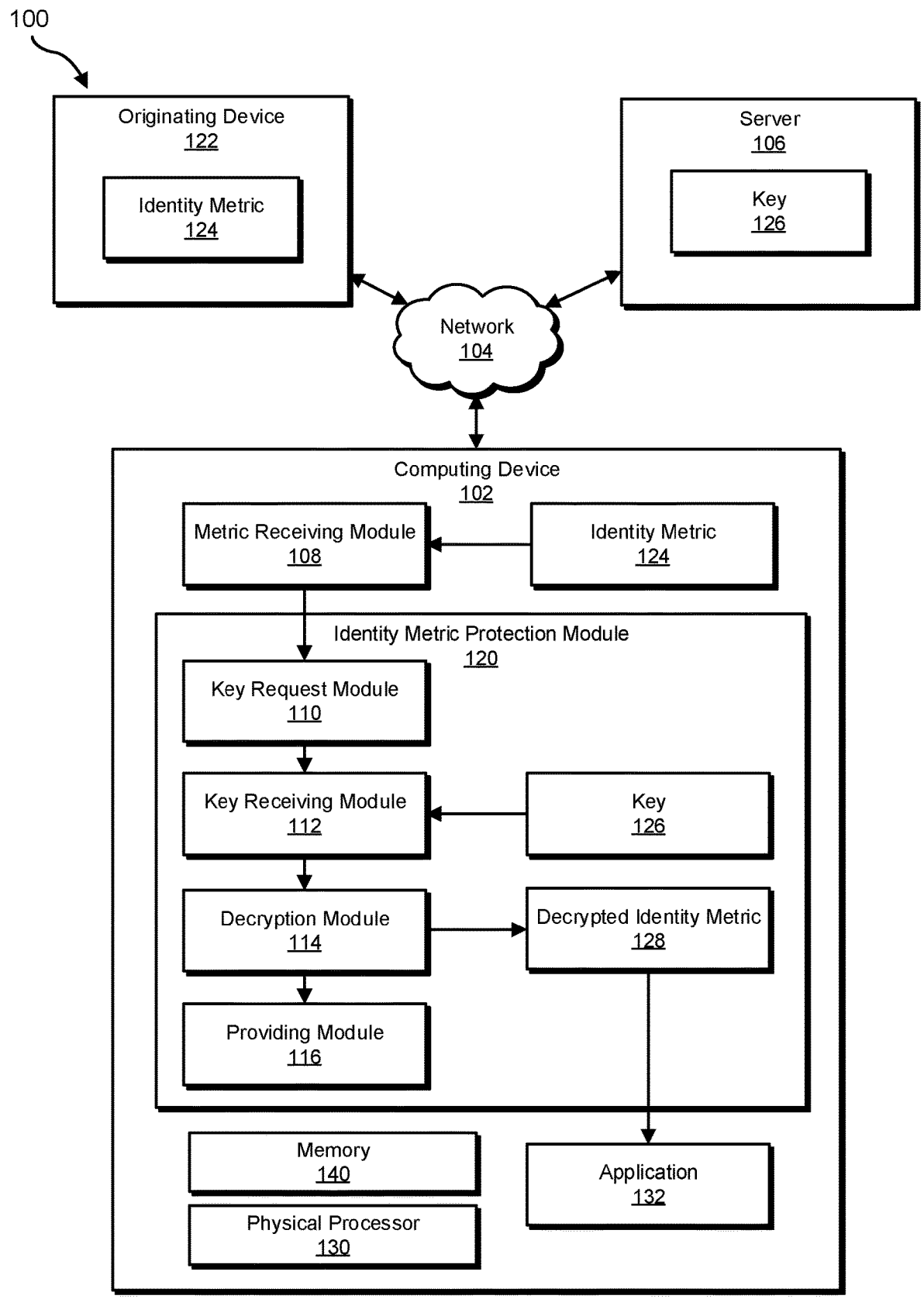
FIG. 1 is a block diagram of an exemplary system for protecting identity metrics.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

An increasing number of communications technologies transmit some type of identity metric of a user across a network. For example, some technologies for transmitting audio of speech may involve sending a fingerprint of the user's voice across the network as well as a textual or other precursor representation of what the user is saying, then combining the two to recreate the user's speech. Due to recreation being involved, this may lead to identity theft concerns. A malicious actor could intercept the user's voice fingerprint (e.g., with a man-in-the-middle-attack) or copy the user's voice fingerprint during an otherwise benign call and use the fingerprint to impersonate the user in later audio calls. To prevent this, the systems described herein may use a custom module to encrypt identity metrics in transit and verify that, on the recipient device, the identity metric is only used by authorized applications. For example, if a first user initiates an audio call to a second user, a custom module installed on each user's device may encrypt, transmit, and/or decrypt the voice fingerprint to ensure that the second user cannot copy the fingerprint and that a malicious actor cannot intercept the fingerprint in transit.

In some embodiments, the systems described herein may improve the functioning of a computing device by enabling the computing device to encrypt and/or decrypt identity metrics via a hardware and/or software module. For example, the systems described herein may configure a computing device with a hardware module that enables the computing device to decrypt encrypted identity metrics that the computing device would not otherwise be able to decrypt without the hardware module. Additionally, the systems described herein may improve the fields of communication and/or information security by reducing users' risk of identity theft when using communication methods that involve transmission of an identity metric across a network and/or to additional devices.

Figure 2:
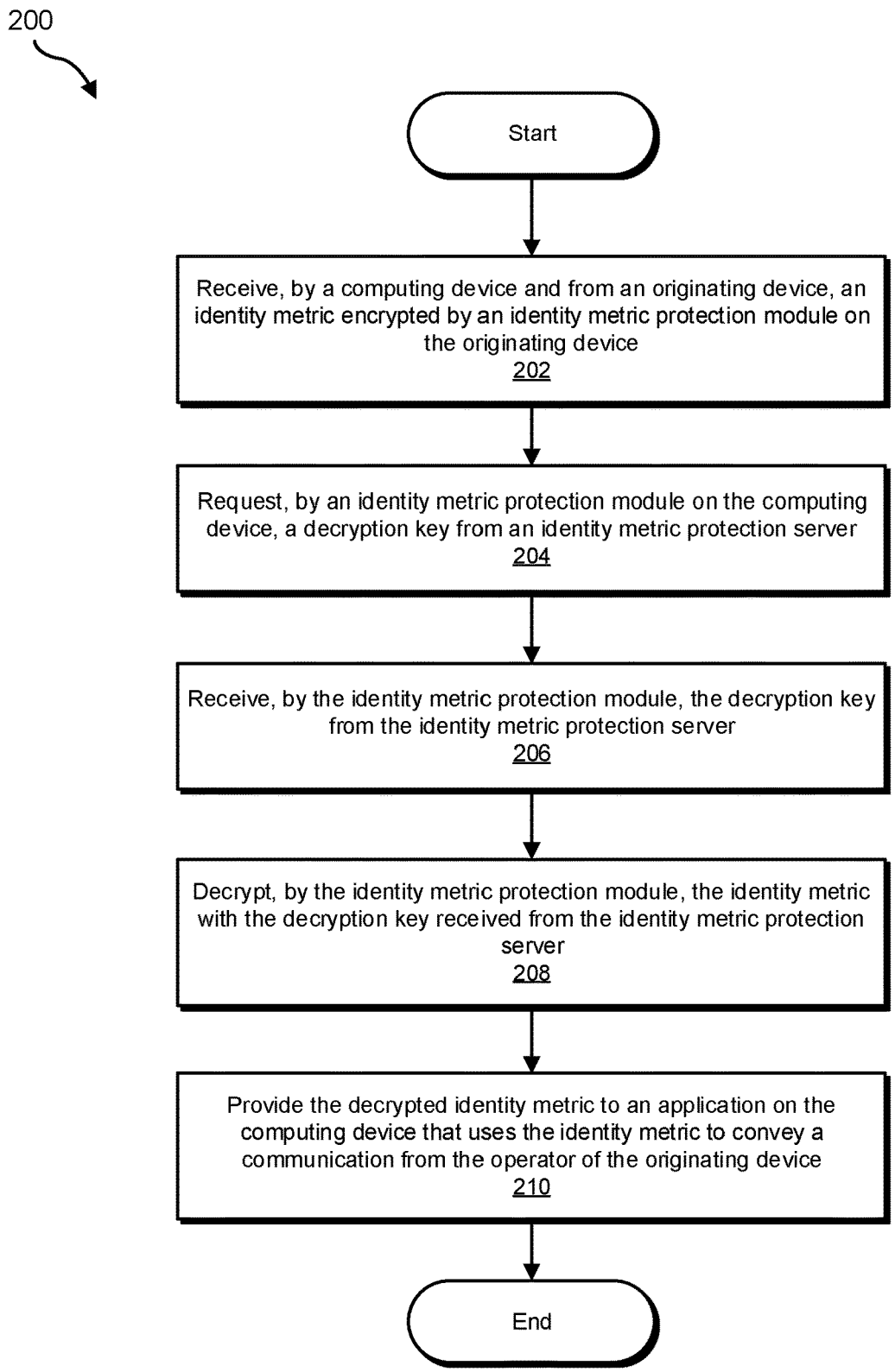
FIG. 2 is a flow diagram of an exemplary method for protecting identity metrics.
Figure 3:
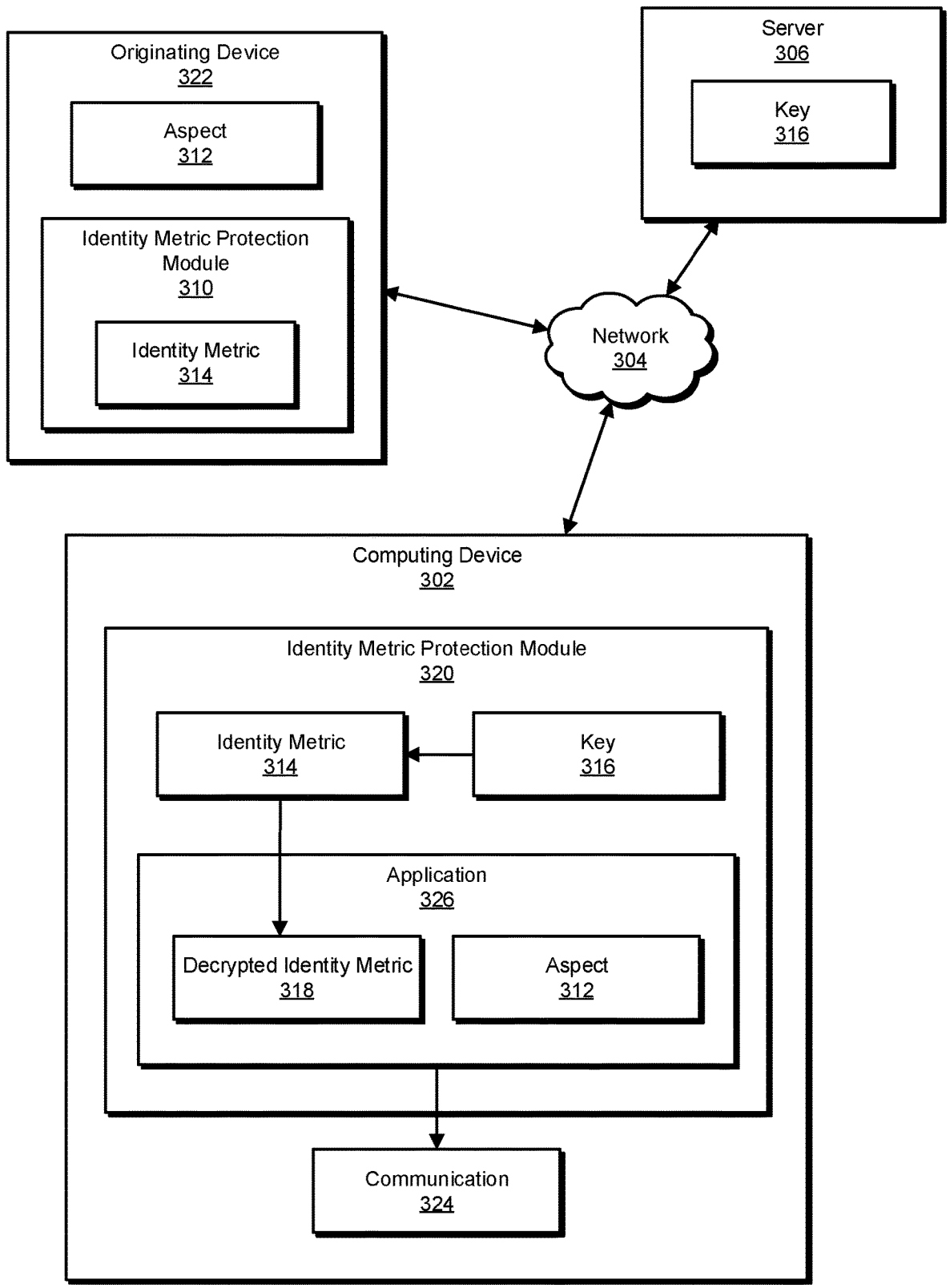
FIG. 3 is an illustration of an exemplary system for protecting identity metrics.

The following will provide detailed descriptions of systems for protecting identity metrics with reference to FIGS. 1 and 3. Detailed descriptions of methods for protecting identity metrics will be provided with reference to FIGS. 2 and 4. In addition, detailed descriptions of examples involving voice fingerprints and three-dimensional models will be provided in connection with FIGS. 5 and 6, respectively.

In some embodiments, the systems described herein may operate on a computing device that contacts a server. FIG. 1 is a block diagram of an exemplary system 100 for protecting identity metrics. In one embodiment, and as will be described in greater detail below, a computing device 102 may be configured with a metric receiving module 108 that may receive, by a computing device 102 and from an originating device 122 (e.g., via a network 104), an identity metric 124 encrypted by an identity metric protection module 120 on originating device 122, where identity metric 124 includes biometric data about an operator of originating device 122. In some examples, a key request module 110 may request, by identity metric protection module 120 on computing device 102, a key 126 from a server 106. Next, key receiving module 112 may receive, by identity metric protection module 120, key 126 from server 106. After receiving key 126, a decryption module 114 may decrypt, by identity metric protection module 120, identity metric 124 with key 126 received from server 106. In some examples, a providing module 116 may provide decrypted identity metric 128 to an application 132 on computing device 102 that uses identity metric 124 to convey a communication from the operator of originating device 122.

Server 106 generally represents any type or form of backend computing device that may store, generate, and/or transmit decryption keys. In some embodiments, server 106 may be configured to verify the identity and/or authorization of computing devices and/or modules that request encryption keys. Examples of server 106 may include, without limitation, security servers, application servers, database servers, and/or any other relevant type of server. Although illustrated as a single entity in FIG. 1, server 106 may include and/or represent a group of multiple servers that operate in conjunction with one another.

Computing device 102 generally represents any type or form of computing device capable of reading computer-executable instructions. For example, computing device 102 may represent a personal computing device and/or endpoint computing device. Examples of computing device 102 may include, without limitation, a laptop, a desktop, a wearable device, a smart device, an artificial reality device, a personal digital assistant (PDA), etc.

Identity metric protection module 120 generally represents any software and/or hardware module capable of encrypting and/or decrypting identity metrics. In one embodiment, identity metric protection module 120 may include a hardware trusted platform module that includes a dedicated microcontroller designed to store, generate, and/or otherwise process cryptographic keys. In some embodiments, identity metric protection module 120 may be part of an identity metric protection system and/or service that includes identity metric protection modules on endpoint devices and one or more identity metric protection servers that communicates with the identity metric protection modules (e.g., by sending decryption keys).

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of the modules stored in memory 140. Additionally or alternatively, physical processor 130 may execute one or more of the modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

FIG. 2 is a flow diagram of an exemplary method 200 for protecting identity metrics. In some examples, at step 202, the systems described herein may receive, by a computing device and from an originating device, an identity metric encrypted by an identity metric protection module on the originating device. For example, metric receiving module 108 may, as part of computing device 102 in FIG. 1, receive, by computing device 102 and from originating device 122, identity metric 124 encrypted by identity metric 124 protection module on originating device 122.

The term "identity metric" may generally refer to any physical characteristic of a person's body, voice, smell, and/or movement that identifies the person. For example, an identity metric may include biometric data that is a measurement and/or calculation relating to a user's body. In some examples, an identity metric may be usable to reconstruct an aspect of a user's physical appearance and/or behavior. For example, a voice fingerprint and/or vocal fingerprint may be an identity metric that includes a user's unique vocal attributes (e.g., speaking pattern, intonation, pitch, etc.). In some examples, a voice fingerprint may be usable to reconstruct a user's speech when combined with text that stores the content of the speech. Similarly, in some examples, an identity metric may include a three-dimensional (3D) model of a user's face and/or body that may be usable to reconstruct a user's body shape, movements, facial expressions, and/or body language.

Metric receiving module 108 may receive the identity metric in a variety of contexts. For example, metric receiving module 108 may be part of a voice and/or video call system that may receive a voice fingerprint as part of a voice call. In another example, metric receiving module 108 may be part of a video and/or artificial reality (AR) system that may receive a 3D model of a user as part of a video call and/or an AR experience (e.g., an AR game, an AR meeting, etc.).

At step 204, one or more of the systems described herein may request, by an identity metric protection module on the computing device, a decryption key from an identity metric protection server. For example, key request module 110 may, as part of computing device 102 in FIG. 1, request, by identity metric protection module 120 on computing device 102, a key 126 from a server 106.

Key request module 110 may request the key in a variety of ways and/or contexts. For example, key request module 110 may request the key in response to receiving an encrypted identity metric. In one embodiment, key request module 110 may request the key from the server in response to receiving a request for a decryption key and/or decrypted identity metric from an application that received an encrypted identity metric. In some embodiments, key request module 110 may be part of an identity metric protection system and/or service that includes an identity metric protection module on an endpoint computing device as well as an identity metric protection server that provides decryption keys to authorized identity protection modules.

At step 206, one or more of the systems described herein may receive, by the identity metric protection module, the decryption key from the identity metric protection server. For example, key receiving module 112 may, as part of computing device 102 in FIG. 1, receive, by identity metric protection module 120, key 126 from server 106.

Key receiving module 112 may receive a decryption key in a variety of ways. For example, key receiving module 112 may receive a decryption key sent via a specialized secure protocol for transmitting decryption keys for identity metrics. In other examples, key receiving module 112 may receive a key sent via a multi-use protocol, such as hypertext transfer protocol secure (HTTPS).

At step 208, one or more of the systems described herein may decrypt, by the identity metric protection module, the identity metric with the decryption key received from the identity metric protection server. For example, decryption module 114 may, as part of computing device 102 in FIG. 1, decrypt, by identity metric protection module 120, identity metric 124 with key 126 received from server 106.

At step 210, one or more of the systems described herein may provide the decrypted identity metric to an application on the computing device that uses the identity metric to convey a communication from the operator of the originating device. For example, providing module 116 may, as part of computing device 102 in FIG. 1, provide decrypted identity metric 128 to application 132 on computing device 102 that uses identity metric 124 to convey a communication from the operator of originating device 122.

Providing module 116 may provide the decrypted identity metric in a variety of ways. For example, providing module 116 may provide the decrypted identity metric to an application within the identity metric protection module. In some embodiments, providing module 116 may provide the decrypted identity metric to an application outside the identity protection module. In one embodiment, the identity metric protection module may prevent copying of the identity metric by preventing any process that is not authorized by the identity metric protection module from accessing the decrypted identity metric. In some examples, providing module 116 may determine whether an application is authorized to receive decrypted identity metrics (e.g., by checking against a list of approved applications, analyzing the application with a heuristic, calculating and/or retrieving a trustworthiness score for the application, etc.) before providing the decrypted identity metric to the application.

In some embodiments, the systems described herein may prevent copying of the identity metric by preventing any process external to the identity metric protection module from accessing the decrypted identity metric. For example, as illustrated in FIG. 3, a computing device 302 may be configured with an identity metric protection module 320 that receives an identity metric 314 from an originating device 322 (e.g., via a network 304). In some embodiments, an identity protection module 310 on originating device 322 may have encrypted identity metric 314 before transmission. In one embodiment, identity metric protection module 320 may request and receive a key 316 from a server 306 and may use key 316 to decrypt identity metric 314. In some embodiments, an application 326 within identity metric protection module 320 may combine decrypted identity metric 318 with an aspect 312 of communication received from originating device 322 to recreate a communication 324 from an operator of originating device 322. Examples of aspect 312 may include, without limitation, text of speech, coordinates of body position, description of facial expression, and/or any other contents of a communication. By combining aspect 312 with decrypted identity metric 318, the systems described herein may recreate communication that involves a user speaking certain words in their own voice, making facial expressions, using body language, and/or otherwise moving or making sounds.

Figure 4:
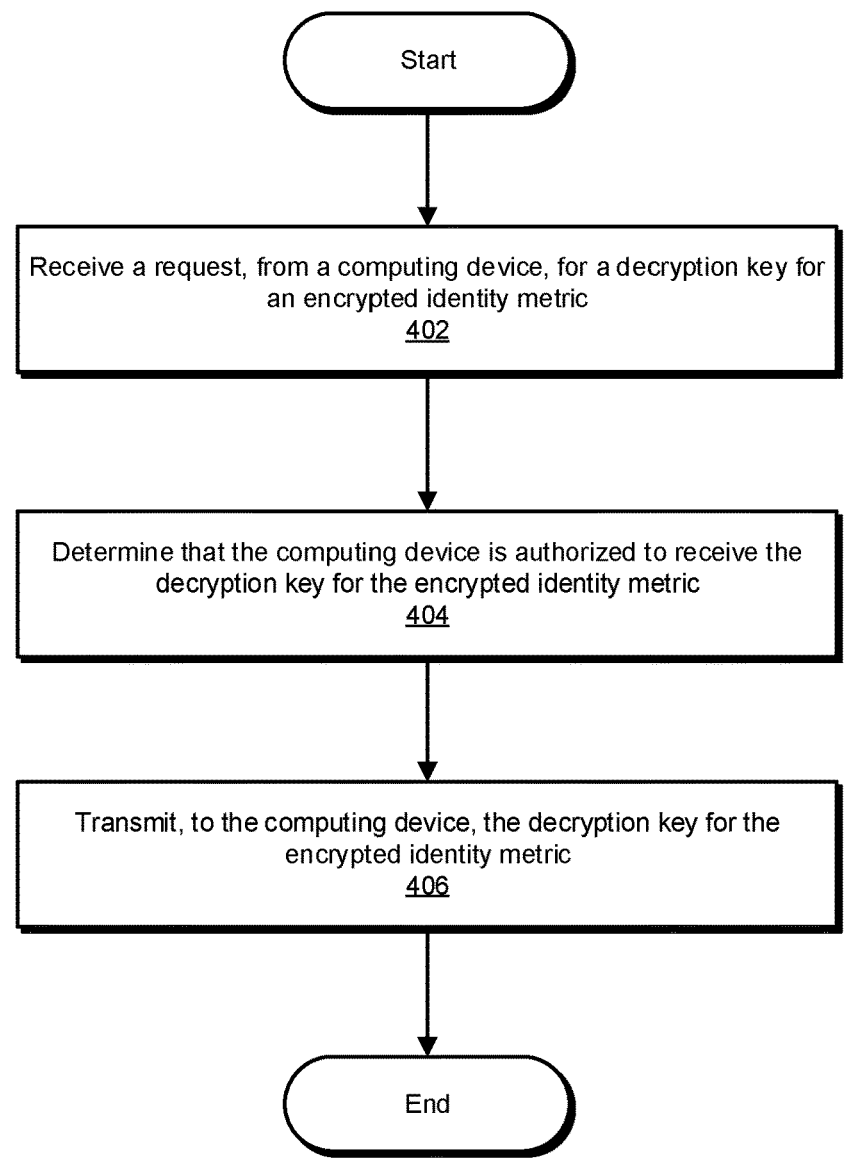
FIG. 4 is a flow diagram of an exemplary method for protecting identity metrics via a server.

In some embodiments, the systems described herein may operate on a server, such as an identity metric protection server. FIG. 4 is a flow diagram of an exemplary method 400 for protecting identity metrics via an identity metric protection server. In some examples, at step 402, a server may receive a request, from a computing device, for a decryption key for an encrypted identity metric. In one example, the server may receive the request from an endpoint computing device such as a laptop, smart phone, or tablet. In some examples, at step 404, the server may determine that the computing device is authorized to receive the decryption key for the encrypted identity metric. For example, the server may check the computing device against a list of authorized computing devices. In another example, the server may receive a code and/or handshake from an identity metric protection module on the computing device that identifies the identity metric protection module as an authorized recipient of decryption keys. In some embodiments, the server may determine that the specific computing device is authorized to receive a decryption key for the particular identity metric (e.g., by checking against a list of authorized computing devices and/or receiving a message from the computing device on which the identity metric was encrypted). If the server determines that the computing device is authorized, at step 406, the server may transmit, to the computing device, the decryption key for the encrypted identity metric. In some embodiments, the systems described herein may rotate keys during a call to protect against brute force attacks. For example, the systems described herein may generate and/or transmit new keys every five seconds, every thirty seconds, and/or every minute.

Figure 5:
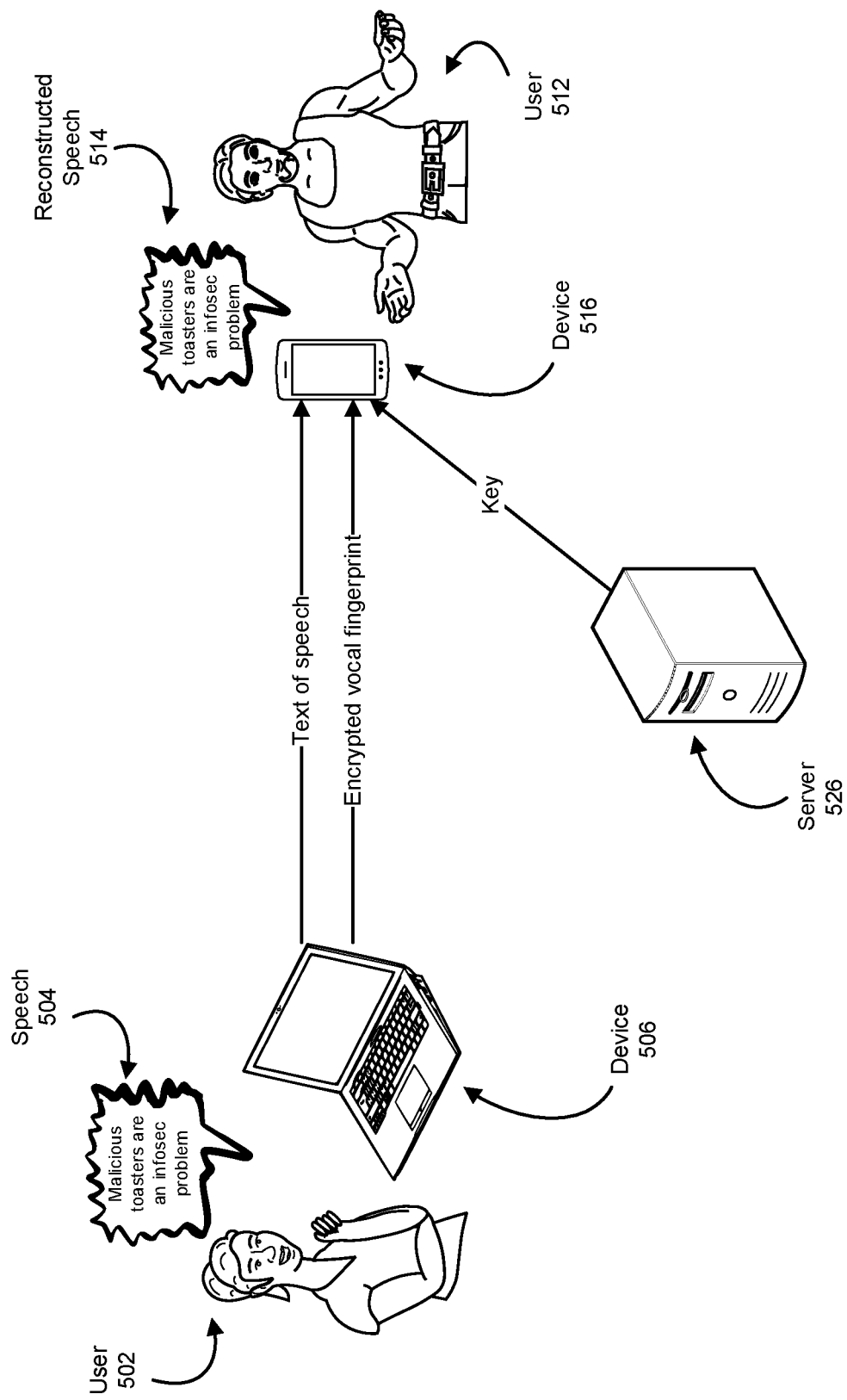
FIG. 5 is an illustration of an exemplary system for protecting voice fingerprints of users.

In some examples, the identity metric may include a voice fingerprint. For example, as illustrated in FIG. 5, a user 502 may have a voice conversation with a user via 512 via devices 506 and 516, respectively. In one example, device 506 may capture speech 504 from user 502. In one example, device 506 may use a speech-to-text algorithm to extract the text of speech 504. In one embodiment, an identity metric protection module on device 506 may store a voice fingerprint of user 502. In one example, device 506 may send the text of speech 504 as well as an encrypted version of the voice fingerprint to device 516. In some embodiments, rather than sending the text of speech 504, device 506 may transmit another precursor, such as a condensed version of the content of the speech that can be used by device 516 to re-create the text of the speech. In some examples, an identity metric protection module on device 516 may receive the encrypted voice fingerprint and/or text of speech 504 and may request a decryption key for the voice fingerprint from a server 526. In one example, the identity metric protection module on device 516 may receive the decryption key from server 526 and may combine the decrypted voice fingerprint with the text of speech 504 to create reconstructed speech 514 that includes the text of speech 504 spoken in the voice of user 502.

Figure 6:
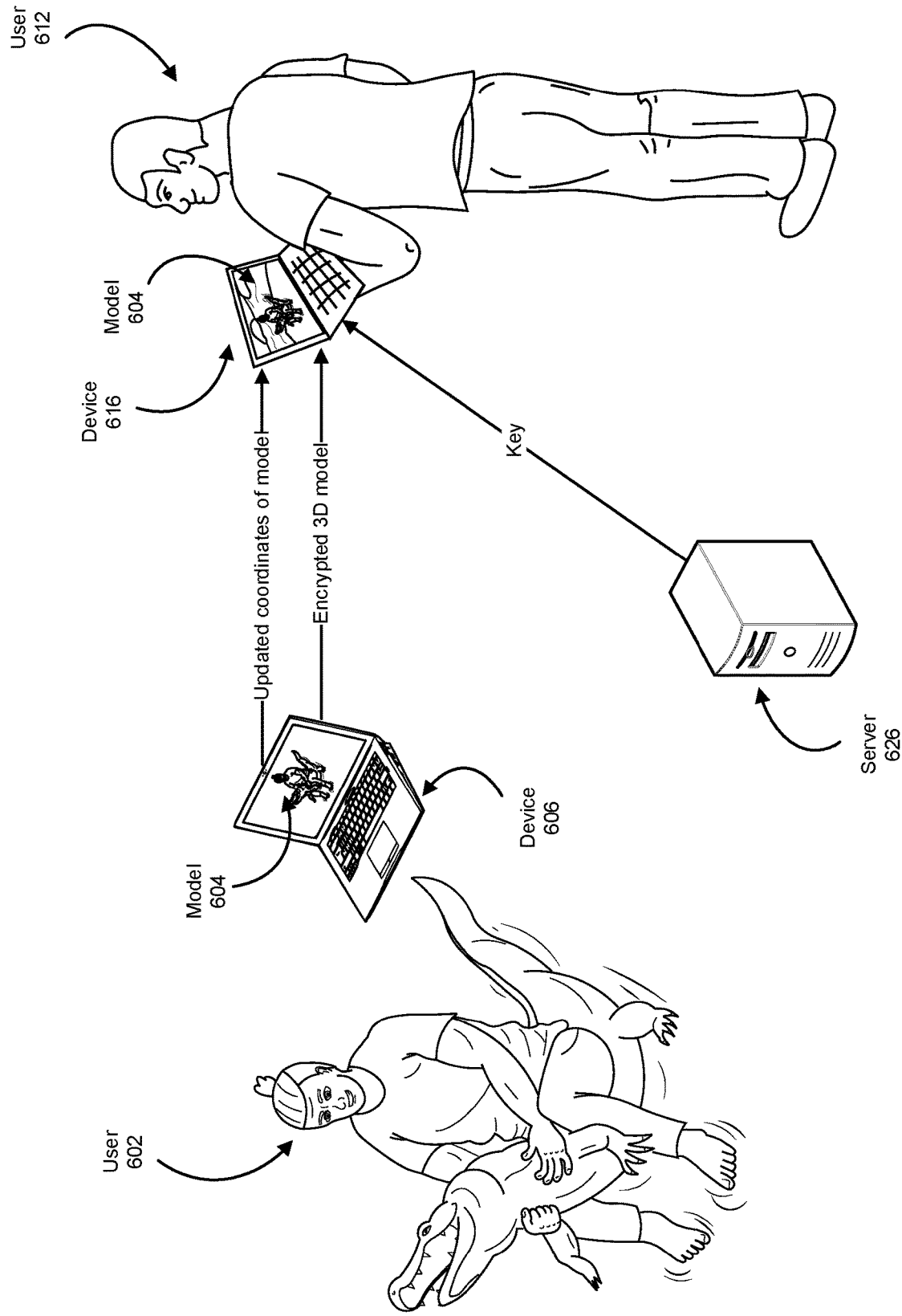
FIG. 6 is an illustration of an exemplary system for protecting three-dimensional models of users.

Additionally or alternatively, an identity metric may include a 3D model of some or all of a user's body. For example, as illustrated in FIG. 6, a user 602 may participate in a video call with a user 612 via an AR environment and/or video-conference application that includes a 3D model 604 of user 602 and that is displayed to user 612 via a device 616. In one embodiment, a device 606 may capture visual data of user 602 (e.g., via various physical cameras in the environment around user 602) and may use that visual data to create and/or update model 604. In some examples, user 602 may be performing an activity such as alligator wrestling, cooking, exercising, etc., that takes user 602 in and out of camera range and/or causes user 602 to turn at different angles, causing camera coverage of various parts of user 602 to lapse. Because the systems described herein store model 604 of user 602, the systems described herein may be able to reposition model 604 to reflect the current positioning of user 602 and show an accurate view of the entirety of user 602, even if some portion of user 602 is currently not visible to any cameras. For example, if user 602 is currently facing away from all relevant cameras, the systems described herein may be able to continue displaying the front side of user 602 to user 612 (e.g., if a representation of user 612 walks around to face a representation of user 602 in an AR environment) by using the data stored in model 604.

In one embodiment, an identity metric protection module on device 606 may encrypt model 604 and may transmit the encrypted version of model 604 and/or updated coordinates for model 604 (e.g., updated based on the movement and/or current position of user 602) to device 616. In some embodiments, an identity metric protection module on device 616 may request a decryption key for encrypted model 604 from a server 626 and/or may use a decryption key to decrypt encrypted model 604. In some examples, device 616 may then use the updated coordinates to update the position and/or view of model 604 in order to convey the current position, location, and/or expression of user 602 to user 612 by displaying an accurate current view of the physical appearance of user 602 within the AR environment and/or video-conferencing application.

As described above, the systems and methods described herein may improve the security of communications systems that transmit identity metrics by preventing those identity metrics from being accessible to processes outside of a trusted identity metric protection module. In some examples, a user may speak or move, have that speech or movement captured by a device, and have another device recreate that speech or movement without the identity metric used in the recreation (e.g., the voice fingerprint and/or 3D model) ever being accessible outside the identity metric protection system. In this way, the systems described herein may drastically reduce identity theft concerns generated by systems that store data which can be used to recreate an aspect of a user's physical identity.

EXAMPLE EMBODIMENTS

Example 1: A method for protecting identity metrics may include (i) receiving, by a computing device and from an originating device, an identity metric encrypted by an identity metric protection module on the originating device, where the identity metric includes biometric data about an operator of the originating device, (ii) requesting, by an identity metric protection module on the computing device, a decryption key from an identity metric protection server, (iii) receiving, by the identity metric protection module, the decryption key from the identity metric protection server, (iv) decrypting, by the identity metric protection module, the identity metric with the decryption key received from the identity metric protection server, and (v) providing the decrypted identity metric to an application on the computing device that uses the identity metric to convey a communication from the operator of the originating device.

Example 2: The computer-implemented method of example 1, where the identity metric includes a voice fingerprint of the operator of the originating device.

Example 3: The computer-implemented method of examples 1-2, where the application uses the identity metric to convey the communication by reconstructing speech of the operator based at least in part on the voice fingerprint of the operator.

Example 4: The computer-implemented method of examples 1-3, where the identity metric includes a three-dimensional model of the operator of the originating device.

Example 5: The computer-implemented method of examples 1-4, where the application uses the identity metric to convey the communication by reconstructing a physical appearance of the operator based at least in part on the three-dimensional model of the operator.

Example 6: The computer-implemented method of examples 1-5, where receiving the identity metric includes receiving an aspect of the communication and providing the decrypted identity metric to the application that uses the identity metric to convey the communication includes combining the identity metric with the aspect of the communication to reconstruct the communication captured by the originating device.

Example 7: The computer-implemented method of examples 1-6, where the communication includes at least one of speech of the operator of the originating device or body language of the operator of the originating device.

Example 8: The computer-implemented method of examples 1-7, where the identity metric protection module includes a hardware module.

Example 9: The computer-implemented method of examples 1-8, where the identity metric protection module includes the application that uses the identity metric to convey the communication.

Example 10: The computer-implemented method of examples 1-9 may further include preventing, by the identity metric protection module, copying of the identity metric by preventing, by the identity metric protection module, any process external to the identity metric protection module from accessing the decrypted identity metric.

Example 11: The computer-implemented method of examples 1-10 may further include preventing, by the identity metric protection module, copying of the identity metric by preventing, by the identity metric protection module, any process that is not authorized by the identity metric protection module from accessing the decrypted identity metric.

Example 12: A system for protecting identity metrics may include at least one physical processor and physical memory including computer-executable instructions that, when executed by the physical processor, cause the physical processor to (i) receive, by a computing device and from an originating device, an identity metric encrypted by an identity metric protection module on the originating device, where the identity metric includes biometric data about an operator of the originating device, (ii) request, by an identity metric protection module on the computing device, a decryption key from an identity metric protection server, (iii) receive, by the identity metric protection module, the decryption key from the identity metric protection server, (iv) decrypt, by the identity metric protection module, the identity metric with the decryption key received from the identity metric protection server, and (v) provide the decrypted identity metric to an application on the computing device that uses the identity metric to convey a communication from the operator of the originating device.

Example 13: The computer-implemented method of example 12, where the identity metric includes a voice fingerprint of the operator of the originating device.

Example 14: The computer-implemented method of examples 12-13, where the application uses the identity metric to convey the communication by reconstructing speech of the operator based at least in part on the voice fingerprint of the operator.

Example 15: The system of examples 12-14, where the identity metric includes a three-dimensional model of the operator of the originating device.

Example 16: The system of examples 12-15, where the application uses the identity metric to convey the communication by reconstructing a physical appearance of the operator based at least in part on the three-dimensional model of the operator.

Example 17: The system of examples 12-16, where receiving the identity metric includes receiving an aspect of the communication and providing the decrypted identity metric to the application that uses the identity metric to convey the communication includes combining the identity metric with the aspect of the communication to reconstruct the communication captured by the originating device.

Example 18: The system of examples 12-17, where the communication includes at least one of speech of the operator of the originating device or body language of the operator of the originating device.

Example 19: The system of examples 12-18, where the identity metric protection module includes a hardware module.

Example 20: A system for protecting identity metrics may include (i) an identity metric protection module on an originating computing device that encrypts an identity metric, (ii) an identity metric protection module on a receiving computing device that receives the encrypted identity metric from the originating computing device, and (iii) an identity metric protection server that (a) receives a request, from the receiving computing device, for a decryption key for the encrypted identity metric, (b) determines that the receiving computing device is authorized to receive the decryption key for the encrypted identity metric, and (c) transmits, to the receiving computing device, the decryption key for the encrypted identity metric.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, by a computing device and from an originating device during an augmented reality experience,
     a captured representation of an audio-visual communication including text of speech of an operator of the originating device and coordinates of one or more body positions of the operator of the originating device, and
     an encrypted identity metric including a voiceprint of the operator of the originating device and one or more measurements relating to a body of the operator of the originating device;
   generating, by an identity metric protection module on the computing device and in response to receiving the encrypted identity metric, a decryption key request showing that the identity metric protection module on the computing device is an authorized recipient of a decryption key for the encrypted identity metric unique to the operator of the originating device;
   receiving, by the identity metric protection module on the computing device and in response to transmitting the decryption key request to an identity metric protection server, the decryption key for the encrypted identity metric from the identity metric protection server;
   decrypting, by the identity metric protection module on the computing device, the encrypted identity metric with the decryption key received from the identity metric protection server; and providing the captured representation and the decrypted identity metric to an application on the computing device that uses the decrypted voiceprint from the identity metric in combination with the text of the speech of the operator of the originating device to reconstruct spoken language of the operator of the originating device and the decrypted one or more measurements relating to the body of the operator of the originating device from the identity metric in combination with the coordinates of the one or more body positions of the operator of the originating device to generate a 3D model that mimics movement of the operator of the originating device during the augmented reality experience.

2. The computer-implemented method of claim 1, wherein the captured representation further comprises descriptions of facial expressions of the operator of the originating device during the audio-visual communication.

3. The computer-implemented method of claim 1, wherein the captured representation of the audio-visual communication further comprises information associated with one or more objects that are interacted with by the operator of the originating device during the augmented reality experience.

4. The computer-implemented method of claim 1, wherein the encrypted identity metric further comprises configuration data for the 3D model of the operator of the originating device.

5. The computer-implemented method of claim 4, wherein the 3D model of the operator is of a full body of the operator of the originating device.

6. The computer-implemented method of claim 3, further comprising receiving, by the identity metric protection module on the computing device and in response to transmitting the decryption key request to the identity metric protection server, a rotated decryption key from the identity metric protection server at regular intervals during the augmented reality experience.

7. The computer-implemented method of claim 6, wherein the regular intervals comprise at least one of every five seconds, every thirty seconds, or every minute.

8. The computer-implemented method of claim 1, wherein the identity metric protection module on the computing device comprises a hardware module.

9. The computer-implemented method of claim 1, wherein the identity metric protection module on the computing device comprises the application that uses the decrypted identity metric to reconstruct the spoken language of the operator of the originating device and to generate the 3D model that mimics the movement of the operator of the originating device.

10. The computer-implemented method of claim 1, further comprising preventing, by the identity metric protection module on the computing device, copying of the decrypted identity metric by preventing, by the identity metric protection module on the computing device, any process external to the identity metric protection module on the computing device from accessing the decrypted identity metric.

11. The computer-implemented method of claim 1, further comprising preventing, by the identity metric protection module on the computing device, copying of the decrypted identity metric by preventing, by the identity metric protection module on the computing device, any process that is not authorized by the identity metric protection module on the computing device from accessing the decrypted identity metric.

12. A system comprising:
at least one physical processor; and
physical memory comprising computer-executable instructions that, when executed by the at least one physical processor, cause the at least one physical processor to:
receive, by a computing device and from an originating device during an augmented reality experience,
a captured representation of an audio-visual communication including text of speech of an operator of the originating device and coordinates of one or more body positions of the operator of the originating device, and
an encrypted identity metric including a voiceprint of the operator of the originating device and one or more measurements relating to a body of the operator of the originating device;
generate, by an identity metric protection module on the computing device and in response to receiving the encrypted identity metric, a decryption key request showing that the identity metric protection module on the computing device is an authorized recipient of a decryption key for the encrypted identity metric unique to the operator of the originating device;
receive, by the identity metric protection module on the computing device and in response to transmitting the decryption key request to an identity metric protection server, the decryption key for the encrypted identity metric from the identity metric protection server;
decrypt, by the identity metric protection module on the computing device, the encrypted identity metric with the decryption key received from the identity metric protection server; and
provide the captured representation and the decrypted identity metric to an application on the computing device that uses the decrypted voiceprint from the identity metric in combination with the text of the speech of the operator of the originating device to reconstruct spoken language of the operator of the originating device and the decrypted one or more measurements relating to the body of the operator of the originating device from the identity metric in combination with the coordinates of the one or more body positions of the operator of the originating device to generate a 3D model that mimics movement of the operator of the originating device during the augmented reality experience.

13. The system of claim 12, wherein the captured representation further comprises descriptions of facial expressions of the operator of the originating device during the audio-visual communication.

14. The system of claim 12, wherein the captured representation of the audio-visual communication further comprises information associated with one or more objects that are interacted with by the operator of the originating device during the augmented reality experience.

15. The system of claim 14, further comprising receiving, by the identity metric protection module on the computing device and in response to transmitting the decryption key request to the identity metric protection server, a rotated decryption key from the identity metric protection server at regular intervals during the augmented reality experience.

16. The system of claim 15, wherein the regular intervals comprise at least one of every five seconds, every thirty seconds, or every minute.

17. The system of claim 12, wherein the encrypted identity metric further comprises configuration data for the 3D model of the operator of the originating device.

18. The system of claim 17, wherein the 3D model of the operator is of a full body of the operator of the originating device.

19. The system of claim 12, wherein the identity metric protection module on the computing device comprises a hardware module.

20. A non-transitory computer-readable medium comprising one or more computer-executable instructions that, when executed by at least one processor of a computing device, cause the computing device to:
- receive, from an originating device during an augmented reality experience,
  - a captured representation of an audio-visual communication including text of speech of an operator of the originating device and coordinates of one or more body positions of the operator of the originating device, and
  - an encrypted identity metric including a voiceprint of the operator of the originating device and one or more measurements relating to a body of the operator of the originating device;
- generate, in response to receiving the encrypted identity metric, a decryption key request showing that the computing device is an authorized recipient of a decryption key for the encrypted identity metric unique to the operator of the originating device;
- receive, in response to transmitting the decryption key request to an identity metric protection server, the decryption key for the encrypted identity metric from the identity metric protection server;
- decrypt the encrypted identity metric with the decryption key received from the identity metric protection server; and
- provide the captured representation and the decrypted identity metric to an application on the computing device that uses the decrypted voiceprint from the identity metric in combination with the text of the speech of the operator of the originating device to reconstruct spoken language of the operator of the originating device and the decrypted one or more measurements relating to the body of the operator of the originating device from the identity metric in combination with the coordinates of the one or more body positions of the operator of the originating device to generate a 3D model that mimics movement of the operator of the originating device during the augmented reality experience.

\* \* \* \* \*